(12) United States Patent
Alecu et al.

(10) Patent No.: US 11,401,870 B2
(45) Date of Patent: Aug. 2, 2022

(54) COUPLING AND ASSOCIATED METHOD OF TRANSFERRING TORQUE

(71) Applicant: PRATT & WHITNEY CANADA CORP., Longueuil (CA)

(72) Inventors: Daniel Alecu, Brampton (CA); Michael Conciatori, Saint-Leonard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 13 days.

(21) Appl. No.: 17/022,203

(22) Filed: Sep. 16, 2020

(65) Prior Publication Data

US 2022/0082053 A1   Mar. 17, 2022

(51) Int. Cl.
*F02C 7/06* (2006.01)
*F02C 7/36* (2006.01)

(52) U.S. Cl.
CPC ............ *F02C 7/36* (2013.01); *F05D 2220/76* (2013.01); *F05D 2260/40* (2013.01); *F05D 2300/171* (2013.01); *F05D 2300/434* (2013.01)

(58) Field of Classification Search
CPC .... F02C 7/36; F05D 2220/76; F05D 2260/40; F05D 2300/171; F05D 2300/434
See application file for complete search history.

(56) References Cited

U.S. PATENT DOCUMENTS

| | | | |
|---|---|---|---|
| 2,970,019 A | 9/1958 | Brown et al. | |
| 3,712,434 A | 1/1973 | Anderson et al. | |
| 4,098,096 A * | 7/1978 | Chard | F16D 3/76 464/903 |
| 4,357,137 A * | 11/1982 | Brown | F16D 1/101 464/159 |
| 5,573,461 A | 11/1996 | Colford | |
| 6,843,727 B2 * | 1/2005 | Counter | F16D 3/54 464/903 |
| 7,691,028 B2 * | 4/2010 | Hattenbach | F02C 7/275 74/718 |
| 7,763,336 B2 * | 7/2010 | Clarke | C08G 18/10 428/36.9 |
| 7,980,956 B2 * | 7/2011 | Kneeshaw | F16D 3/52 464/49 |
| 9,529,315 B1 * | 12/2016 | Kawai | F16D 1/101 |

(Continued)

FOREIGN PATENT DOCUMENTS

FR   1446757   7/1966

*Primary Examiner* — Shafiq Mian
(74) *Attorney, Agent, or Firm* — Norton Rose Fulbright Canada LLP

(57) ABSTRACT

The coupling can have a female member configured to rotate around an axis, defining an axial recess, and having a plurality of connections circumferentially arranged along a radially inner face; a male member extending inside the axial recess concentrically to the female member and having a plurality of connections circumferentially arranged along a radially outer face; and a plurality of circumferentially arranged links, each link having an inner end engaged with a corresponding one of the male member connections, and an outer end engaged with a corresponding female member connection, the links being slanted off the radial orientation, with the inner end being circumferentially offset from the outer end, the links subjected to compression when transmitting torque between the female member and male member.

20 Claims, 6 Drawing Sheets

(56) References Cited

U.S. PATENT DOCUMENTS

| 10,837,496 B2 | 11/2020 | Kowalewski et al. |
| 2008/0009354 A1* | 1/2008 | Hodjat .................... F16D 3/54 |
| | | 464/87 |
| 2016/0298603 A1 | 10/2016 | Guern et al. |

* cited by examiner

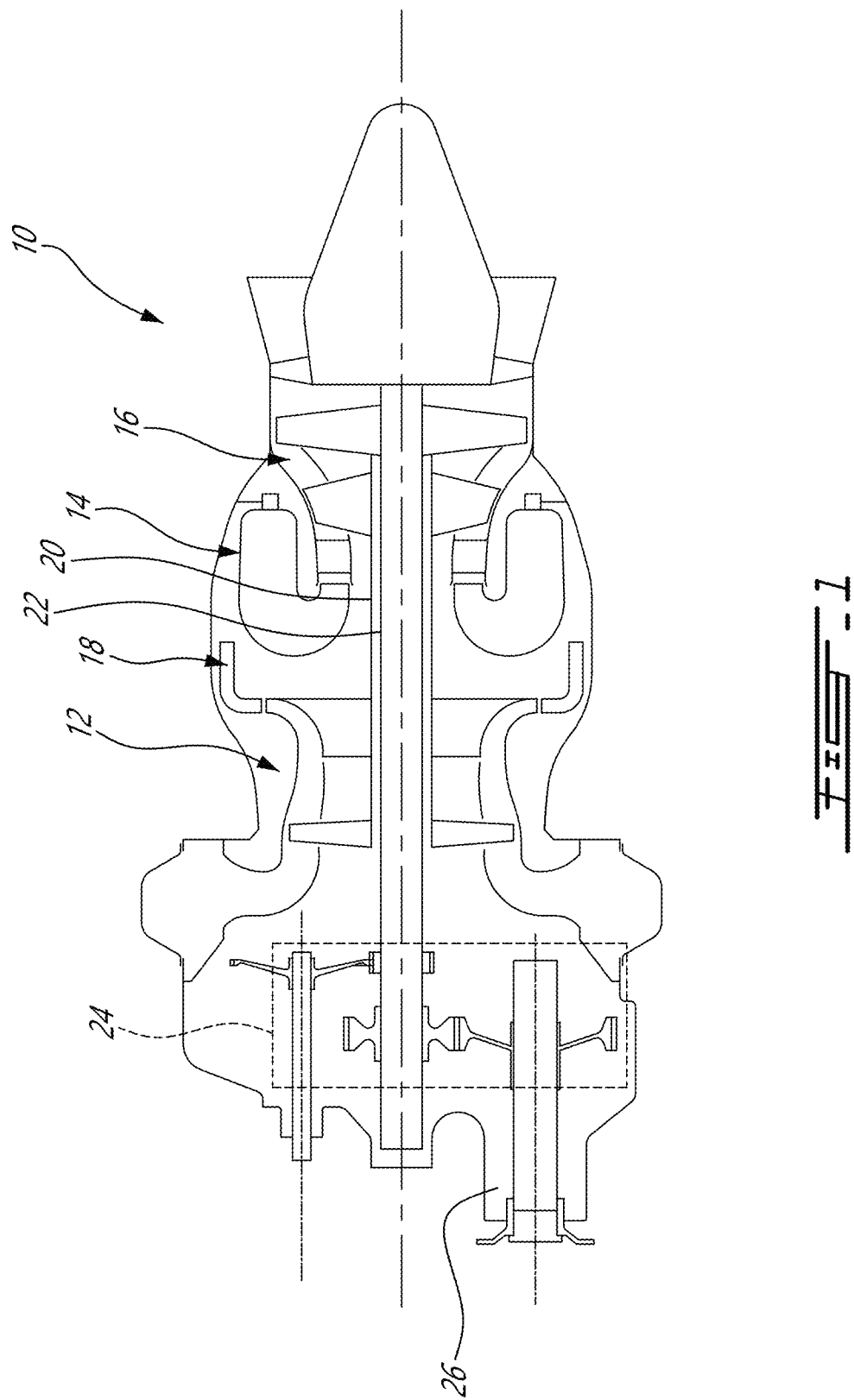

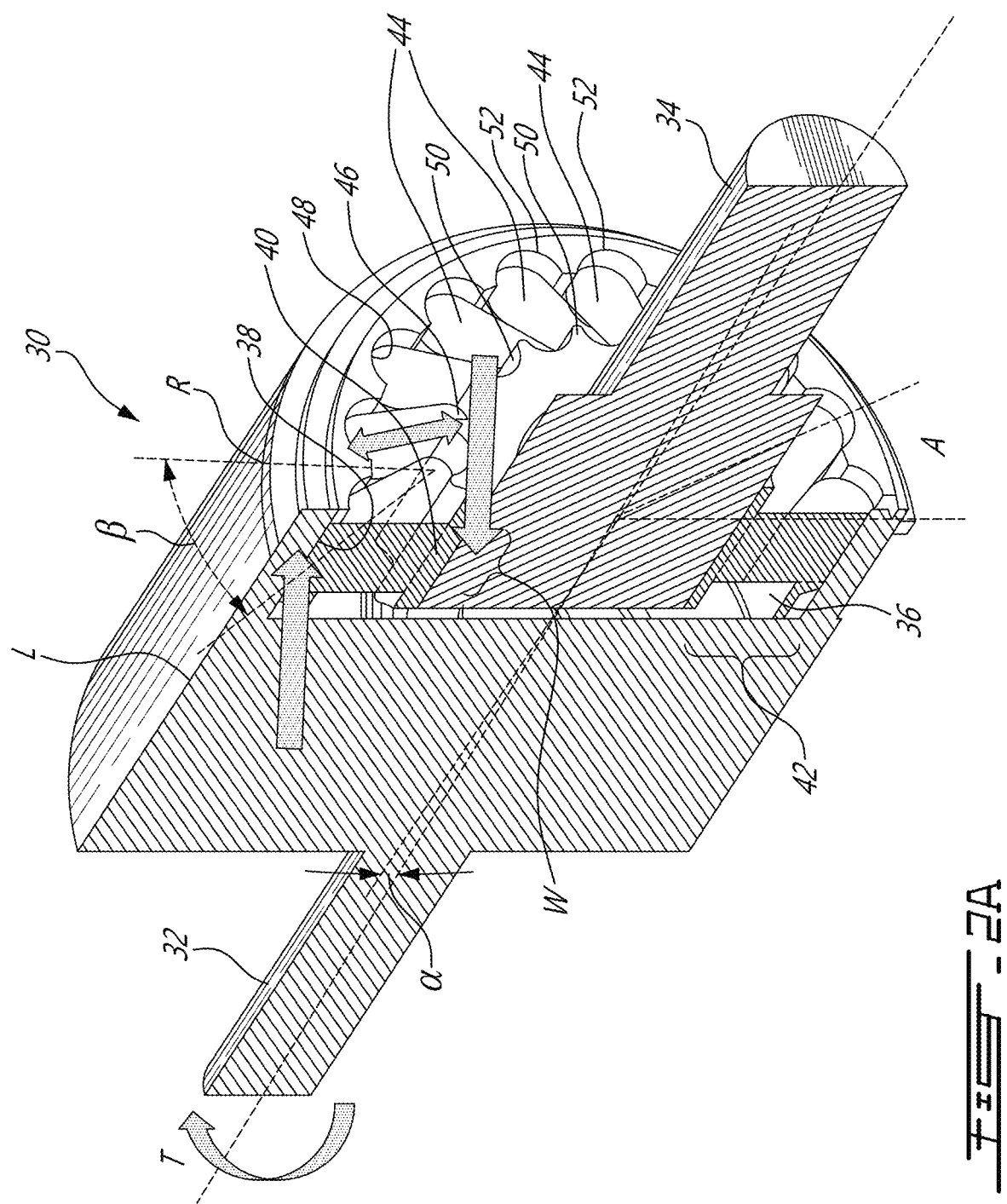

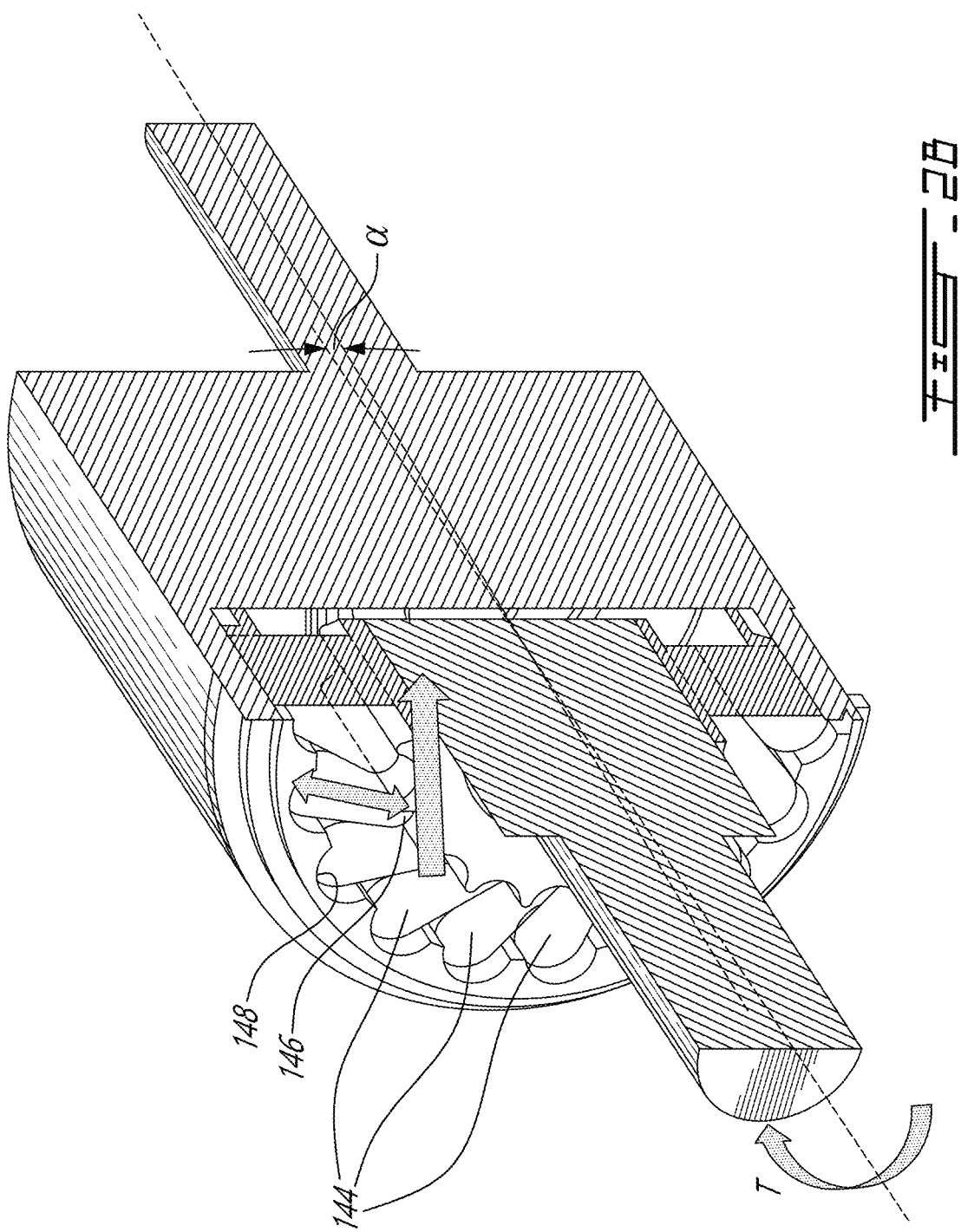

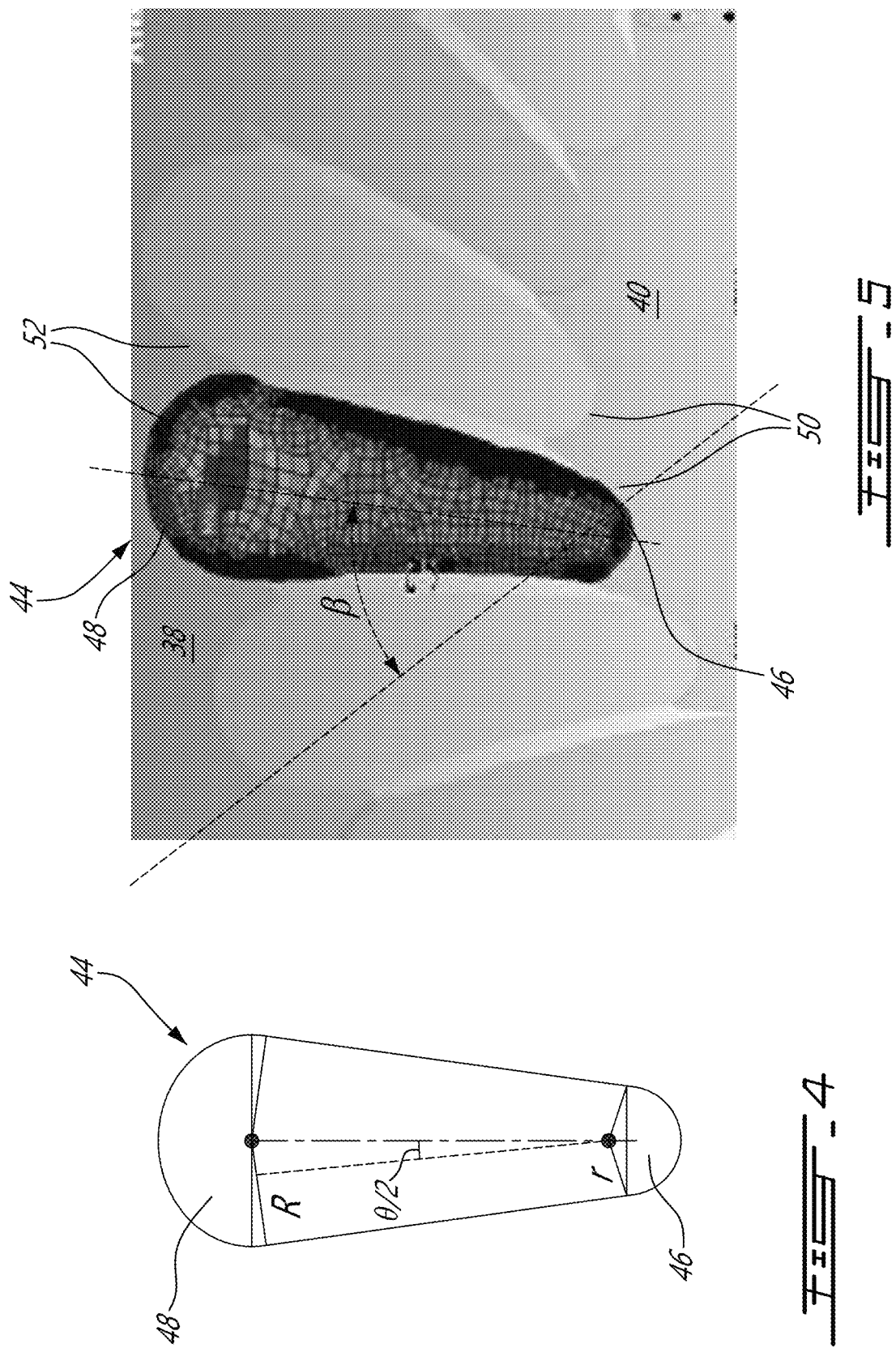

COUPLING AND ASSOCIATED METHOD OF TRANSFERRING TORQUE

TECHNICAL FIELD

The application relates generally to a coupling which can be used to transfer torque from a gas turbine engine to a generator.

BACKGROUND OF THE ART

Couplings are used in a wide variety of applications to transfer torque from one rotary component (such as a shaft) of one piece of equipment to a rotary component of another. Common considerations in coupling design include achieving satisfactory dynamic stress resistance and low friction in operating conditions varying across the operation envelope, as well as limiting costs. In aeronautic applications, minimizing weight is also typically a significant design consideration. The individual pieces of equipment can be manufactured separately. Many couplings require to align the axes of the two rotary components within a certain degree of tolerance, to a point which can be difficult or challenging to achieve in practice, and increasing the degree of tolerance to misalignment has represented significant trade-offs or sacrifices on at least some of the design considerations. There always remains room for improvement, such as addressing misalignment tolerance considerations.

SUMMARY

In one aspect, there is provided a coupling comprising: a female member configured to rotate around an axis, defining an axial recess, and having a plurality of connections circumferentially arranged along a radially inner face; a male member extending inside the axial recess concentrically to the female member and having a plurality of connections circumferentially arranged along a radially outer face; and a plurality of circumferentially arranged links, each link having an inner end engaged with a corresponding one of the male member connections, and an outer end engaged with a corresponding female member connection, the links being slanted off the radial orientation, with the inner end being circumferentially offset from the outer end, the links subjected to compression when transmitting torque between the female member and male member.

In another aspect, there is provided a system comprising a gas turbine engine having a driving shaft, a generator having a driven shaft, and a coupling between the driving shaft and the driven shaft, the coupling comprising: a female member provided as part of one of the driving shaft and the driven shaft, the female member configured to rotate around an axis, defining an axial recess, and having a plurality of connections circumferentially arranged along a radially inner face; a male member provided as part of the other one of the driving shaft and the driven shaft, the male member extending inside the axial recess concentrically to the female member and having a plurality of connections circumferentially arranged along a radially outer face; and a plurality of circumferentially arranged links, each link having an inner end engaged with a corresponding one of the male member connections, and an outer end engaged with a corresponding female member connection, the links being slanted off the radial orientation, with the inner end being circumferentially offset from the outer end, the links subjected to compression when transmitting torque between the female member and male member.

In a further aspect, there is provided a method of transferring torque from a driving member to a driven member with a coupling, the coupling including a female member provided as part of one of the driving member and the driven member, and having an axial recess forming a radially internal surface, a male member provided as part of the other one of the driving member and the driven member, having a radially outer surface, and extending inside the axial recess, and a plurality of links circumferentially arranged in an annular spacing between the internal surface and the outer surface, each link having a length extending obliquely relative to a radial orientation, between two ends, and being connected at both ends to a corresponding point of the corresponding surface in a manner preventing it to slide relative the corresponding surface, the method comprising rotating the driving member by applying torque, the torque being transmitted to the driven member by compression between the opposite ends of the links.

DESCRIPTION OF THE DRAWINGS

Reference is now made to the accompanying figures in which:

FIG. 1 is a schematic cross-sectional view of a gas turbine engine;

FIG. 2a is an oblique view of a coupling, in accordance with one embodiment;

FIG. 2b is an oblique view of a coupling, in accordance with another embodiment;

FIG. 4 is a cross-sectional view taken in a transversal plane of an example link design;

FIG. 5 shows finite element analysis results of a link during operation; and

DETAILED DESCRIPTION

Figure 3:
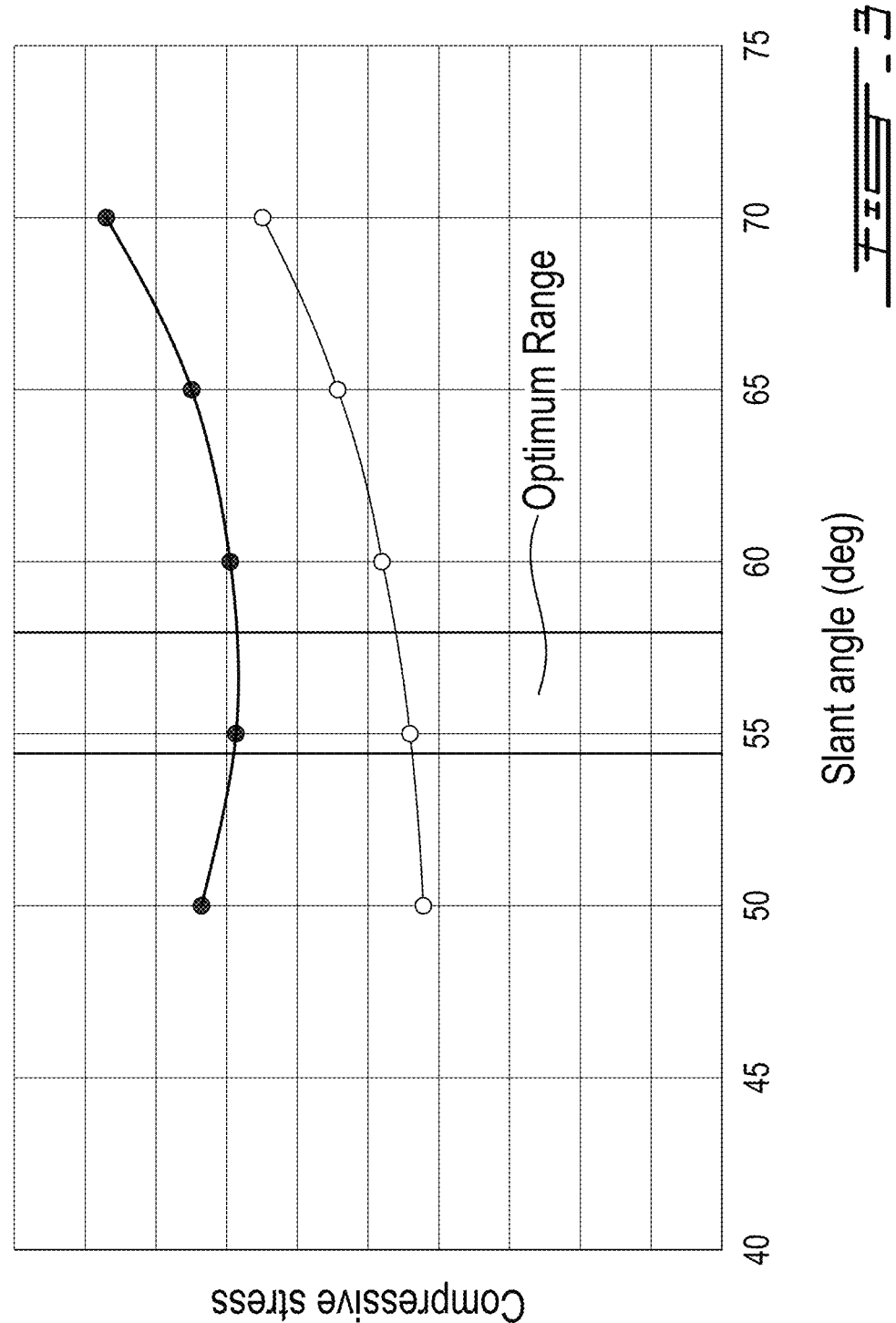
FIG. 3 is a graph plotting compressive stress as a function of slant angle.

FIG. 1 illustrates an example of a turbine engine. In this example, the turbine engine 10 is a turboshaft engine generally comprising in serial flow communication, a multistage compressor 12 for pressurizing the air, a combustor 14 in which the compressed air is mixed with fuel and ignited for generating an annular stream of hot combustion gases, and a turbine section 16 for extracting energy from the combustion gases. The turbine engine terminates in an exhaust section.

The fluid path extending sequentially across the compressor 12, the combustor 14 and the turbine 16 can be referred to as the core gas path 18. In practice, the combustor 14 can include a plurality of identical, circumferentially interspaced, combustor units. In the embodiment shown in FIG. 1, the turboshaft engine 10 has two compressor and turbine stages, including a high pressure stage associated to a high pressure shaft 20, and a low pressure stage associated to a low pressure shaft 22. The low pressure shaft 22 is used as a power source during use.

Turboshaft engines, similarly to turboprop engines, typically have some form of gearing by which the power of the low pressure shaft 22 is transferred to an external shaft 26 bearing the blades or propeller. This gearing, which can be referred to as a gearbox 24, typically reduces the rotation speed to reach an external rotation speed which is better adapted to rotate the blades or propeller for instance. Auxiliary power units have similarities to turboshaft and turboprop engines in that they typically have a power output shaft configured to be used as a power source, and the use of gearboxes are frequent. In the case of an auxiliary power unit, the output shaft can be connected to an electrical generator, for instance.

FIG. 2A shows an example of a coupling 30. The coupling 30 can be used to transfer power from an auxiliary power unit's output shaft to an electrical generator's input shaft for example. It will be understood that in alternate embodiments, the coupling can be used to couple a wide variety of other pieces of equipment than an auxiliary power unit and an electrical generator, the latter being presented as one possible example use in order to make the following description more tangible and easier to read. In some embodiments, the pieces of equipment can be standalone systems or devices, and in others, the pieces of equipment can be different internal components of a single device or system.

As shown in FIG. 2A, the coupling is formed between two rotary members 32, 34, presented here in the form of shafts, and is used generally for the function of transferring torque from one of the rotary members 32 to the other 34. There can be some degree of misalignment (e.g. angle α) which may need to be accommodated between the axes of these rotary members 32, 34. In this embodiment, a first one of the members 32 has a female configuration with an axial recess 36 at an end thereof. The recess 36 forms a radially inner-facing surface 38 which will be referred to herein as more concisely as the inner face. The other one of the members 34 has a male configuration and has a radially outer-facing surface, or outer face 40, engaged within the recess 36. The outer face 40 has a smaller diameter than the inner face 38, and a spacing 42 is present between the two faces 38, 40. A plurality of circumferentially arranged links 44 occupy the spacing 42. Each link 44 has a (radially) inner end 46 connected to the inner face 40, and a (radially) outer end 48 connected to the outer face 38. The connections prevent the corresponding ends 46, 48 from sliding along the surface 38, 40 they are connected to, and thereby fix the relative circumferential position between the corresponding link end 46, 48 and member surface 38, 40. The connection can be pivotal, rigid, or pivotal with a partial rigidity. Different types of connections can be used in different embodiments. Depending of the exact choice of connection type, the link-receiving connections formed in the inner face and the outer face can involve a corresponding form of irregularity in the surface geometry. The irregularity can be in the form of a seat such as a protrusion, recess, or other shape complementary to the shape of the corresponding end, or in the form of a slot or hole to receive a pivot pin, to name some possible examples. The links extend obliquely, in the sense that the general orientation L of their length between the two ends 46, 48 is inclined, or slanted, e.g. by angle β, from the radial orientation R. In other words, the outer end of each link is circumferentially offset from the link's inner end by an arc A.

The rotary member which is the source of the torque can be referred to as the driver member, whereas the one receiving the torque can be referred to as the driven member. In this embodiment, the driver member is the female member 32, and the driven member is the male member 34, but it will be understood that in another embodiment, the male member 34 can be the driving member. The links 44 are configured to work in compression during torque-transfer operation, and transfer torque by a combination of their compression stress (there can also be some degree of bending stress if the connection is not purely pivotal) and of their inclination/obliqueness β. In an embodiment where the female member 32 is the driving member, the inner end 46 of each link 44 will be circumferentially offset from the corresponding outer end 48 in the direction of the torque T, which results in compressing the links. In an alternate embodiment where the male member is the driving member, an example of which is presented at FIG. 2B, the outer ends 148 of the links 144 would instead be circumferentially offset from the corresponding inner ends 146 in the direction of application of the torque T, which would also result in compressing the links during torque transfer. Accordingly, the direction in which the inner ends 46, 146 are circumferentially offset from the outer ends 48, 148 can be selected as a function of the orientation of the torque T, and of whether the female member 32 or the male member 34 is the driving member, with the goal of subjecting the links to compression during torque transfer.

Returning to FIG. 2A, the links 44 can be configured in a manner to operate collectively, but as independent bodies from the point of view of stress gradients. The links can be separate individual components, mechanically connected to one another only indirectly, via the male 34 and female 32 members. By operating partially or fully in compression, and by being shaped and sized appropriately, they can each independently transfer a portion of the torque, without individually imparting shear or tensile stress into an adjacent link. They can be relatively slender (i.e. thin in the orientation normal to their length in a transverse plane), which can allow them to elastically deform to a greater extend than, thicker components, or than a component forming a full annulus. This can contribute in accommodating a satisfactory degree of axial misalignment a between the male member 32 and the female member 34. Moreover, the links 44 can have an axial dimension, referred to herein as width W, which is significant relative to their length, such as in the same order of magnitude, similar or greater dimensions, to spread the compressive force along the width W. Spreading a given amount of compressive force (stemming from a given amount of torque T) along a greater width W, can limit the compressive force density, and allow a greater amount of torsion between the two axially opposite sides. In some embodiments, the torsion deformation capability of the links can be harnessed to accommodate misalignment. In yet some other embodiments, it can be preferred to segment the links into two or more components along their axial length, allowing the individual components to work independently from another, without transmitting torsion stress from one component of the link to the adjacent other one. The width W can be significantly greater than the thickness, for instance. The coupling 30 can be designed in a manner for the full width to remain in contact with both members 32, 34 due to deformation. The links 44 can accommodate misalignment by deformation rather than by displacement relative to the members, which can be favorable from the point of view of wear resistance. In other embodiments it can be preferred to reduce the width W as much as possible in a manner to reduce weight, for instance.

In some embodiments, an even greater degree of axial misalignment may be accommodated by selecting, for the material of the links 44, a material having a Young's modulus significantly lower than the Young's modulus of the material forming the male and female members 32, 34. For instance, in a scenario where the male and female members 32, 34 are made of steel, the links can be made of a suitable plastic. A plastic material with greater viscoelastic behavior can be preferred to accommodate rapid overload, but may be less performant in terms of recovery factor at slower loading rates. The ultimate choice can be left to the designer of a specific embodiment. Polyimide plastic materials such as Vespel™ can constitute an interesting candidate due to features such as heat resistance, and can have a Young's modulus two degrees or magnitude lower (~100 times lower) than the Young's modulus of steel. Depending on the embodiment, other materials can be selected, such as other plastics, structured materials like metal foams, aerogels, and 3D-printed un-isotropic metal lattices which provide a low apparent Young modulus and even be more suitable at higher temperature environments. Similarly, lower cost materials than Vespel™ may be preferred in lower temperature environments.

Another potential reason for selecting a different material for the links than for the male and female members is that it can be preferred for the material of the link to have a greater coefficient of thermal expansion than the coefficient of thermal expansion of the male and female members. Indeed, in cases where the typical operation temperature range of the coupling is significantly above ambient temperature/standard atmospheric conditions, having a greater coefficient of thermal expansion can simplify assembly. Indeed, the length of the links can be designed to be shorter that the distance between the members which they are designed to occupy during operation conditions. Accordingly, the links can be inserted easily into the spacing, with some degree of play allowed at, say, 20° C., and be designed to grow and extend as the temperature rises during normal operation, in a manner to stabilize in an equilibrium configuration where the combination of thermal growth and deformation from mechanical stress lead to maintaining a given design slant angle β at a given set of conditions of torque and temperature, and depart from this target slant angle within set tolerances as the torque and temperature vary within the operation envelope. Similarly, and the thermal "shrinking" can be harnessed at disassembly, to avoid the phenomena of worn parts becoming "hooked" on others, especially in blind assemblies.

The slant angle β can also affect the density of the compressive stress. In one embodiment, it can be preferred to optimize the slant angle β in a manner to minimize compressive stress density. FIG. 3 plots the results of a simulation for compressive stress (y axis) against slant angle (x axis) for an example embodiment such as presented in FIG. 2A, where compressive stress at the outer face 38 is presented by the upper curve, and compressive stress at the inner face 40 is presented by the bottom curve. In a scenario where it is also preferred to limit backlash to within 2 degrees, it can be preferred to select a slant angle of between 52 and 60 degrees measured from the outer pitch diameter tangent, with the range of between 54 and 58 degrees being more preferred in some embodiments. The ideal slant angle can be of 55 degrees in one embodiment, for instance. In other words, the angle β can be of between 30 and 38 degrees, preferably between 32 and 36, and ideally of about 35 degrees.

In some embodiments, connections which allow for pivoting of the links around one or both ends can be preferred, whereas in other embodiments, non-pivotal, or partially pivoting connections which cause bending deformation in the link in addition to compressive stress can be preferred. The connections which are part of the male member can be referred to as the male member connections and the connections which are part of the female member can be referred to as the female member connections for simplicity.

In the example presented in FIG. 2A, pivotal connections were preferred. In the specific embodiment presented in FIG. 2, the pivotal connections were achieved via engagement between rounded ends of the links 44 and matching connections 50, 52 in the form of rounded sockets in the inner surface 40 and outer surface 38. In an alternate embodiment, for instance, the pivotal connection can be achieved via an axially protruding pin in each one of the ends, and a corresponding slot to receive the pin tips on both axial sides of the link, for instance. In still another embodiment, the connections can be provided in the form of rounded protrusions formed in the corresponding one, or both, of the inner face and the outer face, and a rounded recess of a matching shape can be formed in the corresponding end or ends of the link, thereby inversing the male/female roles, to name another possible example. This being said, the pivotal connection configuration selected for the embodiment of FIG. 2A can provide suitable performance, and may be interesting for other reasons as well.

The link and pivotal connection geometry favored in the embodiment of FIG. 2A is presented in greater detail in FIG. 4, which shows an transversal cross-section of an undeformed link 44. As presented in this figure, the link configuration includes a tapered body leading to the two opposite ends 48, 46. The ends are rounded, generally exhibiting an outer arc of a corresponding radius R and r. Two opposite, straight, side faces for a tapered shape. The straight side faces meet the tangent at the ends of the arcs, for a smooth transition, which can be appreciated from the point of view of minimizing stress density. This shape, combined with arranging the links immediately adjacent to one another (e.g. limiting the amount of play between links), leads to substantially filling the spacing 42, or gap, between the inner face 40 and outer face 38, which can also be good from the point of view of stress density management, although it will be understood that in alternate embodiments, it can be preferred to leave a significant amount of free space between adjacent links 44. As shown in FIG. 5, the rounded ends 46, 48 are received here in corresponding connections in the form of rounded recesses 50, 52 respectively made in the inner face 40 and the outer face 38. It will be noted that the rounded recesses 52, 50 can be designed to accommodate the slant angle β. This can include having one side protruding straight from the tangent of the semi-circular shape, or close to the tangent, forming a non-symmetrical shape somewhat reminiscent of waves, but disposed around an otherwise curved surface. This general geometry can be referred to herein as a tapered obround cross-sectional shape.

FIG. 5 goes further and displays the results of finite element computer assisted simulation with a load, with stress being plotted on a blue to red color scale. As can be seen, while the links 44 deform somewhat, the pivot connections at both ends make them work essentially as if they were undergoing purely compressive stress, with no bending, in this embodiment. This model can be preferred in some embodiments, in which case a low friction interface can be preferred at the connection, and which can be achieved using a suitable plastic material for the link and a suitable metal for the male and female member. Alternately, the connections can be configured in a manner to provide limited pivot-ability, which could therefore also involve some degree of bending deformation. In still further embodiments, it can be preferred to rigidly receive one, or both ends of the links, and possibly even integrate the links to one, or even both, the male and female members. A more rigid connection can be achieve by using a square or other polygonal shaped interface instead of circular, for instance. In some embodiments, it can be preferred for the links to be designed in a manner for the strain produced by pure torque to always be larger than the tolerance to displacement due to misalignment.

Figure 6B:
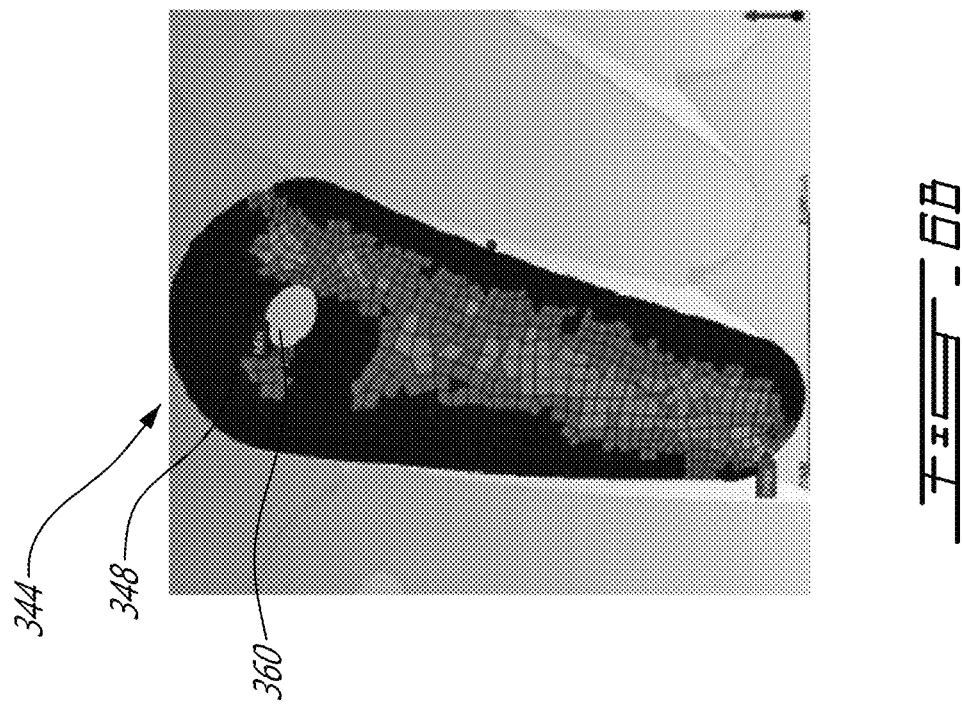
FIGS. 6A and 6B show finite element analysis results of two additional link designs during operation.
Figure 6A:
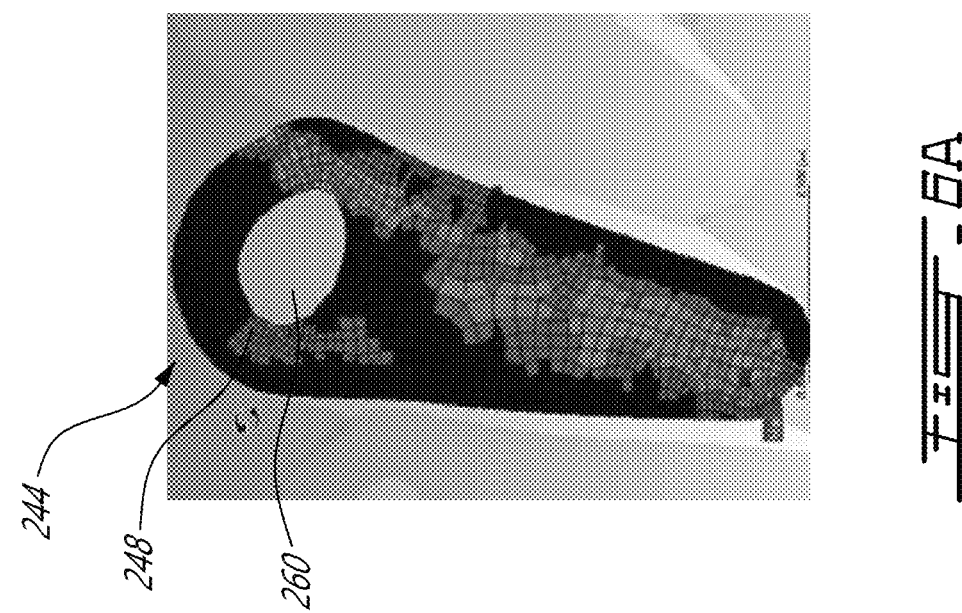

FIGS. 6A and 6B present two alternatives to the example link geometry presented in FIGS. 4 and 5. More specifically, these alternate link geometries 244, 344 preserve the overall external cross-sectional shape of the link 44, taken in a plane normal to the rotation axis, but introduce a circular aperture 260, 360 in the broader outer end 248, 348 of the link 244, 344. As shown in these figures, which also display results of finite element computer assisted simulation in conditions of operation, the presence of the hole can help limit occurrences of high stress concentration, in addition to allow for additional cooling of the links during operation. The embodiment of FIG. 6B was designed with a hole having one quarter of the rounded end's diameter, whereas the embodiment of FIG. 6A was designed with a hole having one half of the rounded end's diameter. Both embodiments can be seen to be better for distributing stress than the embodiment of FIG. 5, with the embodiment of FIG. 6B perhaps being preferable from the point of view of strain energy control, and the embodiment of FIG. 6A perhaps being preferable from the point of view of cooling. In alternate designs, it can be preferred to introduce more than one hole, and the overall geometry of such apertures can depend on the overall external geometry of the link.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications than the ones presented above could be implemented by a person of ordinary skill in the art in view of the present disclosure, which modifications would be within the scope of the present technology.

The invention claimed is:

1. A coupling comprising:
   a female member configured for rotation around an axis, defining an axial recess, and having a plurality of female member connections circumferentially arranged along a radially inner face;
   a male member extending inside the axial recess concentrically to the female member and having a plurality of male member connections circumferentially arranged along a radially outer face; and
   a plurality of circumferentially arranged links, each link having an inner end connected to the male member via a corresponding one of the male member connections, and an outer end connected to the female member via a corresponding one of the female member connections, the links being slanted off a radial orientation relative to the axis, with the inner end being circumferentially offset from the outer end in a given angular direction, the given angular direction configured for subjecting the links to compression when transmitting torque between the female member and male member.

2. The coupling of claim 1 wherein both the male member connections and the female member connections are pivotal connections, allowing pivot movement ability of the corresponding link ends, and blocking circumferential displacement ability.

3. The coupling of claim 2 wherein the pivotal connections of at least one of the male member and the female member are rounded recesses each configured to receive a correspondingly rounded protrusion of a corresponding link end.

4. The coupling of claim 1 wherein the links are made of a material having a Young modulus lower than a Young's modulus of a material forming the female member and male member.

5. The coupling of claim 4 wherein the Young's modulus of the material of the links is at least one order of magnitude lower than the Young's modulus of the material forming the female member and male member.

6. The coupling of claim 1 wherein the links have a coefficient of thermal expansion larger than a coefficient of thermal expansion of the material forming the female member and male member.

7. The coupling of claim 6 wherein the links are shorter than a distance between the corresponding male and female member connections at ambient temperature, and corresponding to the distance between the corresponding male and female member connections during a temperature of operation.

8. The coupling of claim 1 wherein the links each have a length extending between the inner end and the outer end, the links tapering along their length.

9. The coupling of claim 1 wherein the links have a width extending parallel to the axis, normal to the length, the width being of a same order of magnitude as the length.

10. The coupling of claim 1 wherein the links have a thickness extending perpendicular to the length in a plane transverse to the axis, the thickness being smaller than the length.

11. The coupling of claim 8 wherein each link has two opposite faces tapering along the length, the opposite faces merging tangentially into arcs forming corresponding rounded faces at both ends.

12. The coupling of claim 11 wherein the each of the links has an axially-oriented aperture formed concentrically to a diameter of the rounded face of the outer end.

13. The coupling of claim 12 wherein the axially-oriented aperture has a diameter of between 0.25 and 0.5 of the diameter of the rounded face of the outer end.

14. The coupling of claim 1 wherein the links have tapering opposite faces each positioned immediately adjacent a corresponding one of the faces of an adjacent link, wherein the adjacent faces can slide relative to one another during operation.

15. The coupling of claim 1 wherein the links are slanted off tangential by between 52 and 60 degrees.

16. The coupling of claim 1 wherein the links are made of a plastic material.

17. The coupling of claim 1 wherein the links are made of a polyimide, and the male and female members are made of stainless steel.

18. A system comprising:
   a gas turbine engine having a driving shaft;
   a generator having a driven shaft; and
   a coupling between the driving shaft and the driven shaft;
   wherein the coupling further comprises:
      a female member provided as part of one of the driving shaft and the driven shaft, the female member configured to rotate around an axis, defining an axial recess, and having a plurality of connections circumferentially arranged along a radially inner face;
      a male member provided as part of the other one of the driving shaft and the driven shaft, the male member extending inside the axial recess concentrically to the female member and having a plurality of connections circumferentially arranged along a radially outer face; and a plurality of circumferentially arranged links, each link having an inner end engaged with a corresponding one of the male member connections, and an outer end engaged with a corresponding female member connection, the links being slanted off the radial orientation, with the inner end being circumferentially offset from the outer end, the links subjected to compression when transmitting torque between the female member and male member.

19. A method of transferring torque from a driving member to a driven member with a coupling, the coupling including a female member provided as part of one of the driving member and the driven member, and having an axial recess forming a radially internal surface, a male member provided as part of the other one of the driving member and the driven member, having a radially outer surface, and extending inside the axial recess, and a plurality of links circumferentially arranged in an annular spacing between the internal surface and the outer surface, each link having a length extending obliquely relative to a radial orientation, between two ends, and being connected at both ends to a corresponding point of the corresponding surface in a manner preventing it to slide relative the corresponding surface, the plurality of links being individually separated from one another, the method comprising rotating the driving member by applying torque, the torque being transmitted to the driven member by compression between the opposite ends of the links.

20. The method of claim 19, wherein each of the plurality of links link has an inner end and an outer end, the links being slanted off the radial orientation, with the inner end being circumferentially offset from the outer end, the links subjected to compression when transmitting torque between the female member and male member.

* * * * *